United States Patent
Zhao

(10) Patent No.: US 10,789,243 B2
(45) Date of Patent: Sep. 29, 2020

(54) DATABASE STATE DETERMINING METHOD AND DEVICE, AND CONSISTENCY VERIFYING METHOD AND DEVICE

(71) Applicant: Alibaba Group Holding Limited, George Town (KY)

(72) Inventor: Boran Zhao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/665,200

(22) Filed: Oct. 28, 2019

(65) Prior Publication Data
US 2020/0057760 A1 Feb. 20, 2020

Related U.S. Application Data

(63) Continuation of application No. PCT/CN2018/087966, filed on May 23, 2018.

(30) Foreign Application Priority Data

May 25, 2017 (CN) .......................... 2017 1 0377721

(51) Int. Cl.
*G06F 16/20* (2019.01)
*G06F 16/23* (2019.01)
*G06F 16/27* (2019.01)

(52) U.S. Cl.
CPC ...... *G06F 16/2365* (2019.01); *G06F 16/2379* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 2014/0032981 A1 | 1/2014 | Ahmed et al. | |
| 2014/0172897 A1* | 6/2014 | Nakakura | G06F 16/83 707/758 |
| 2016/0292672 A1 | 10/2016 | Fay et al. | |
| 2017/0083860 A1 | 3/2017 | Sriram et al. | |
| 2017/0116693 A1* | 4/2017 | Rae | G06Q 20/3827 |

(Continued)

FOREIGN PATENT DOCUMENTS

| | | |
|---|---|---|
| CA | 2981511 | 6/2016 |
| CN | 1054886 | 7/2000 |
| CN | 101957858 | 1/2011 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jau Shya Meng
(74) *Attorney, Agent, or Firm* — Fish & Richardson P.C.

(57) ABSTRACT

A state transition operation performed on a target database is determined. Based on the state transition operation and a state value of the target database that exists before the state transition operation is performed, a state value of the target database that exists after the state transition operation is performed is determined, where the state value is used to represent a state of the target database.

15 Claims, 6 Drawing Sheets

(56) References Cited

U.S. PATENT DOCUMENTS

2017/0132257 A1* 5/2017 Baird, III ............... G06F 16/22
2017/0132270 A1 5/2017 Ahmed et al.

FOREIGN PATENT DOCUMENTS

| CN | 1023542 | 2/2012 |
| CN | 102662946 | 9/2012 |
| CN | 103164523 | 6/2013 |
| CN | 103345521 | 10/2013 |
| CN | 103678583 | 3/2014 |
| CN | 104346454 | 2/2015 |
| CN | 104731792 | 6/2015 |
| CN | 105447046 | 3/2016 |
| CN | 105976232 | 9/2016 |
| CN | 106230808 | 12/2016 |
| CN | 106250721 | 12/2016 |
| CN | 106357405 | 1/2017 |
| CN | 106484690 | 3/2017 |
| CN | 107247749 | 10/2017 |
| EP | 3557452 | 10/2019 |
| RU | 2425449 | 7/2011 |
| WO | WO 2018214897 | 11/2018 |

OTHER PUBLICATIONS

Nakamoto, "Bitcoin: A Peer-to-Peer Electronic Cash System," www.bitcoin.org, 2005, 9 pages.
PCT International Preliminary Report on Patentability in International Application No. PCT/CN2018/087966, dated Nov. 26, 2019, 11 pages (with English translation).
PCT International Search Report and Written Opinion in International Application No. PCT/CN2018/087966, dated Aug. 3, 2018, 16 pages (with English translation).
European Extended Search Report in European Patent Application No. 18805650.1, dated Jan. 2, 2020, 8 pages.
Antonopoulos, "Mastering Bitcoin—Unlocking Digital Cryptocurrencies," 2nd Release, O'Reilly Media, 2014, pp. 161-175.

* cited by examiner

DATABASE STATE DETERMINING METHOD AND DEVICE, AND CONSISTENCY VERIFYING METHOD AND DEVICE

CROSS-REFERENCE TO RELATED APPLICATIONS

This application is a continuation of PCT Application No. PCT/CN2018/087966, filed on May 23, 2018, which claims priority to Chinese Patent Application No. 201710377721.8, filed on May 25, 2017, and each application is hereby incorporated by reference in its entirety.

TECHNICAL FIELD

The present application relates to the field of computer technologies, and in particular, to a database state determining method and device, and a database consistency verifying method and device.

BACKGROUND

When storing data, a computer sometimes stores the same piece of data in a plurality of different databases. Data stored in these different databases usually needs to be synchronized based on a service requirement, that is, the data stored in the databases usually needs to be consistent. The blockchain technology is used as an example. After verification is performed, a plurality of transaction records are written into all nodes (databases corresponding to the nodes) that store blockchain data. To ensure that a new block that is accepted by all the nodes is generated, data stored in all the databases corresponding to all the nodes should be consistent. For another example, in case of a primary/secondary database in distributed storage, to help restore data from another database (the secondary database) when an error occurs in data in the primary database, data stored in the primary database and data stored in the secondary database usually also need to be consistent.

To ensure that data stored in a plurality of databases are consistent, consistency check can be performed on the data in the plurality of databases, and a remedial measure can be taken in a timely manner when the data is found to be inconsistent. Because the database usually includes a lot of data, database consistency check is usually performed by comparing a state value that is used to represent a state of data in the database, instead of comparing all data in the plurality of databases one by one. For ease of description, the state of the data in the database can be referred to as a database state.

In the existing technology, after data in a database changes each time, a state value of the database needs to be re-determined. When the state value is determined, the state value is usually calculated by using all data in the database. For example, the state value can be a hash value of the data in the database. In this case, when the hash value is determined, all the data in the database needs to be spliced to obtain a string. Then, the string is used as the input of a hash function, and the hash value is calculated by using the hash function. In this case, when the database includes a relatively large amount of data, a relatively large quantity of computing resources are consumed when the database state value is determined.

SUMMARY

Implementations of the present application provide a database state determining method, to alleviate an existing-technology problem that a relatively large quantity of computing resources are consumed when a database state value is determined.

The following technical solutions are used in the implementations of the present application.

A database state determining method is provided, including: determining a state transition operation performed on a target database; and determining, based on the determined state transition operation and a state value that is of the target database and that exists before the state transition operation is performed, a state value that is of the target database and that exists after the state transition operation is performed, where the state value is used to represent a state of the target database.

The implementations of the present application further provide a database state determining device, to alleviate an existing-technology problem that a relatively large quantity of computing resources are consumed when a database state value is determined.

A database state determining device is provided, including: a first determining unit, configured to determine a state transition operation performed on a target database; and a second determining unit, configured to determine, based on the determined state transition operation and a state value that is of the target database and that exists before the state transition operation is performed, a state value that is of the target database and that exists after the state transition operation is performed, where the state value is used to represent a state of the target database.

A database consistency verifying method is provided, including: determining whether a state value of a first database to be checked and a state value of a second database to be checked are the same, where the state value of the first database and the state value of the second database are determined by using the database state determining method provided in the present application; and if the state value of the first database and the state value of the second database are the same, determining that a state of the first database and a state of the second database are consistent.

A database consistency verifying device is provided, including: a state determining unit, configured to determine whether a state value of a first database to be checked and a state value of a second database to be checked are the same, where the state value of the first database and the state value of the second database are determined by using the database state determining device provided in the present application; and a consistency determining unit, configured to: when it is determined that the state value of the first database and the state value of the second database are the same, determine that a state of the first database and a state of the second database are consistent.

At least one of the previous technical solutions used in the implementations of the present application can achieve the following beneficial effects:

When the state value of the database whose data changes due to the state transition operation is determined, the state transition operation performed on the target database is determined, and then the state value that is of the database and that exists after the state transition operation is performed is determined based on the determined state transition operation and the state value that is of the database and that exists before the state transition operation is performed. Compared with the existing technology, there is no need to perform an operation on all data in the entire database, thereby reducing the consumption of excessive computing resources.

BRIEF DESCRIPTION OF DRAWINGS

The accompanying drawings described here are intended to provide a further understanding of the present application and constitute a part of the present application. The illustrative implementations of the present application and descriptions of the implementations are intended to describe the present application and constitute no limitation on the present application. In the accompanying drawings.

DESCRIPTION OF IMPLEMENTATIONS

To make the objectives, technical solutions, and advantages of the present application clearer, the following clearly and completely describes the technical solutions of the present application with reference to specific implementations and corresponding accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

As computer technologies develop, it is increasingly common to verify whether data in all databases is consistent. A blockchain is used as an example. The blockchain is a distributed database, a change of each piece of data in the blockchain is broadcast to each blockchain node in the entire network, and all the nodes need to have full and consistent data. Data is usually stored in a plurality of data units on each node. A data unit can be a block in the blockchain, or can be a data unit that includes a plurality of blocks. When a state value of the node is determined, a hash tree such as a Merkle tree is constructed by using a hash value of data in each data unit as a leaf node, and then a hash value of a root node of the hash tree is used as the state value of the database, so that the state value is used to uniquely represent a state of the database.

Figure 1:
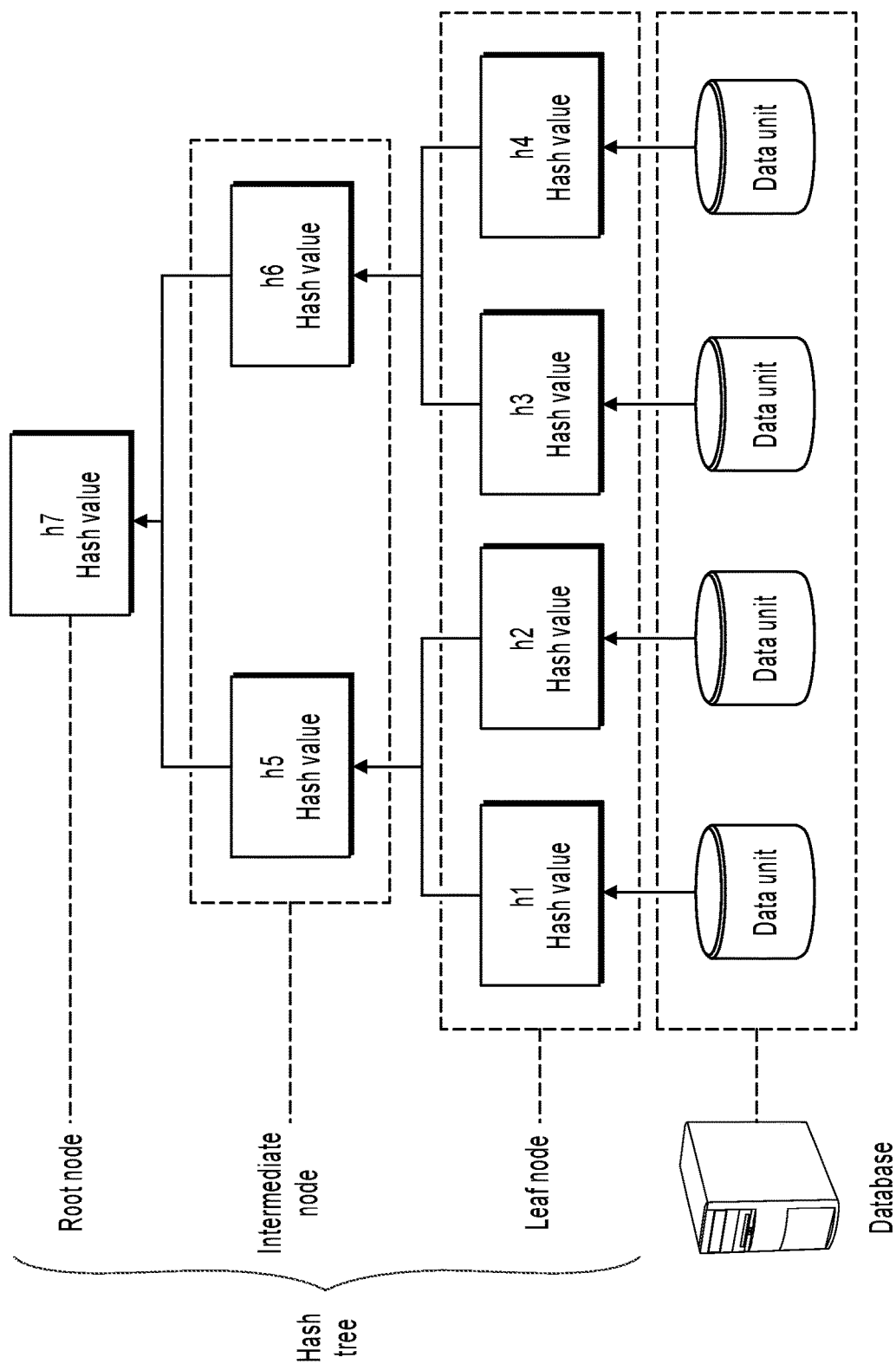
FIG. 1 is a schematic diagram illustrating a data structure of a hash tree, according to the present application.

FIG. 1 is a schematic diagram illustrating a data structure of a hash tree constructed for a certain database. When a hash value of a root node of the hash tree is calculated, a hash value of data in each data unit is first calculated, then the obtained hash value is used as a value of a leaf node of the hash tree, and a hash value of a parent node of each leaf node is calculated, so that the hash value of the root node of the hash tree is finally obtained. After data in the database changes, a state value of the database needs to be re-determined. As such, the previous process of calculating the hash value of the root node of the hash tree needs to be repeated. If there is a large amount of data in the database, a hash operation needs to be performed on a large amount of data. This consumes a large quantity of computing resources.

In some similar scenarios, when the state value of the database is determined, a relatively large quantity of computing resources are also consumed. Details are omitted here for simplicity. To alleviate the problem, the present application provides a database state determining method, so that a state of a target database is determined based on a state transition operation performed on the target database.

The following describes in detail the database state determining method provided in the present application. The method can be performed by a computing device, for example, a database node in a distributed database or a node in a blockchain. In addition, the method can be performed by an application program that implements the database state determining method provided in the present application. For ease of description, an implementation of the method is described below by using an example that the method is performed by a computing device. It can be understood that, that the method is performed by a computing device is only an example for description, and should not be considered as a limitation on the method.

Figure 2:
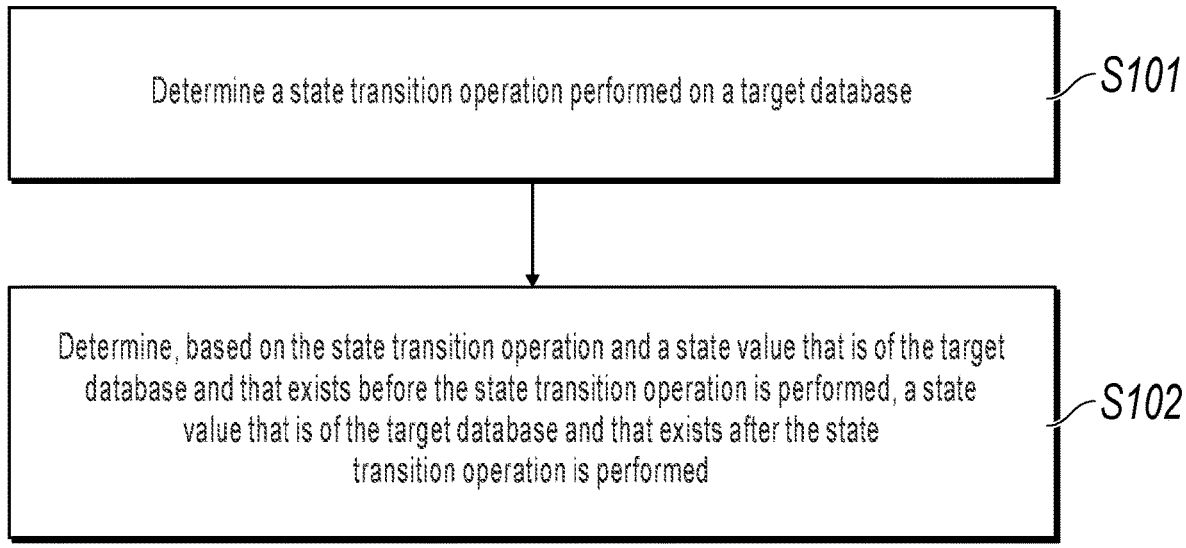
FIG. 2 is a schematic implementation flowchart illustrating a database state determining method, according to the present application.

FIG. 2 is a schematic implementation flowchart illustrating a database state determining method, according to the present application. The method includes the steps below.

Step S101: Determine a state transition operation performed on a target database.

The state transition operation here can be a database operation that causes a state change of a database, and can be specifically an operation such as a data write operation, a data update operation, or a data deletion operation. The state transition operation can include processed data and a method for processing the data. For example, the data write operation includes data to be written and a specific location that the data needs to be written to in the database. The target database here can be a database that the state transition operation is performed on, and the target database can be any database whose state value is to be determined.

In actual applications, there can be many methods for determining the state transition operation. For example, in an object-oriented application program, if the state transition operation is implemented by an object, the state transition operation can be determined by determining a data operation object corresponding to the state transition operation; or the state transition operation can be determined based on a database operation statement corresponding to the state transition operation. The data operation object here is a data object that is in an object-oriented application program and is used to perform a database operation. In the object-oriented application program, an "object" is generally an instance whose class is loaded in a memory, and has related member variables and member functions.

Because a state transition operation causes a change of data in a database, after the state transition operation is determined, a state that is of the database and that exists after the state transition operation is performed can be determined.

Step S102: Determine, based on the determined state transition operation and a state value that is of the target database and that exists before the state transition operation is performed, a state value that is of the target database and that exists after the state transition operation is performed.

The state value here is used to represent a state of the target database. Because the state value can be used to perform consistency check on the target database, the state value can be used to uniquely represent a characteristic of data stored in the target database. For example, the state value can be a hash value or can be a globally unique identifier. The hash value is obtained by performing a hash operation on an input parameter by using a hash function. The globally unique identifier can be an identifier that is allocated by a system and that is used to uniquely identify a database state in the system.

It is worthwhile to note that, a person skilled in the art should be aware that "uniquely represent" should not be construed as absolute uniqueness but means uniqueness within an allowed error range. Currently, for the most widely used hash algorithm, theoretically, different input data have the same output hash value, that is, a hash collision exists.

A state existing after data in a database changes is related to a state existing before the data changes and a state transition operation. As such, after the state transition operation performed on the target database is determined, the state value that is of the target database and that exists after the state transition operation is performed can be determined based on the determined state transition operation and the state value that is of the target database and that exists before the operation is performed.

In actual applications, as described in step S101, in the object-oriented application program, the state transition operation can be determined by determining the data operation object corresponding to the state transition operation. Subsequently, the state value that is of the target database and that exists after the state transition operation is performed can be determined based on the determined data operation object and the state value that is of the target database and that exists before the state transition operation is performed.

To help distinguish between different state transition operations by using a short identifier, the state transition operation can also be uniquely represented by using a certain characteristic value. The characteristic value of the state transition operation can be a hash value, or can be a globally unique identifier used to uniquely identify the state transition operation. Details are omitted here for simplicity. To help calculate the characteristic value of the state transition operation and the state value of the target database to obtain the state value that is of the target database and that exists after the state transition operation is performed, a data format of the characteristic value can be the same as or similar to a data format of the state value of the target database.

In actual applications, for the object-oriented application program, a hash value of the data operation object can be determined, and then the state value that is of the target database and that exists after the state transition operation is performed is determined based on the determined hash value of the data operation object and the state value that is of the target database and that exists before the state transition operation is performed.

The following specifically describes a process of determining the hash value of the data operation object in this implementation of the present application.

When the hash value of the data operation object is determined, to convert a data format of the data operation object into a format supported by the input of a hash algorithm, a serialization operation can be performed on the data operation object. The serialization operation can convert state information of the object into a format that can be stored or transmitted. After the serialization operation is performed on the data operation object, serialized data corresponding to the data operation object can be obtained. For example, a data format of the serialized data can be a binary format, and data in the binary format can be used as the input of the hash algorithm.

After the serialized data corresponding to the data operation object is obtained, a hash operation can be performed on the serialized data to obtain a hash value of the serialized data, and the hash value of the serialized data can be used as the hash value of the data operation object.

It is worthwhile to note that, a single state transition operation usually corresponds to more than one data operation object, for example, each state transition operation performed for a node in a blockchain usually corresponds to a plurality of data operation objects. As such, when the data operation object corresponding to the state transition operation is serialized, all the data operation objects can be separately serialized; next, all obtained serialized data is spliced sequentially; and finally, obtained spliced serialized data is used as serialized data corresponding to the state transition operation.

When all the obtained serialized data is spliced sequentially, if a sequence of performing the state transition operation by all the data operation objects is fixed, the serialized data corresponding to all the data operation objects is spliced based on the sequence of performing the state transition operation, to obtain the spliced serialized data. Alternatively, if a sequence of performing the state transition operation by all the data operation objects is not fixed, the serialized data corresponding to all the data operation objects is spliced based on a first predetermined sequence, to obtain the spliced serialized data. Then, a hash value of the spliced serialized data can be calculated by using a hash function, and the hash value of the spliced serialized data is used as the hash value of the data operation object corresponding to the state transition operation.

The first predetermined sequence can be a predetermined splicing sequence. For example, if a format of data in each data operation object is a key-value format, the serialized data corresponding to all the data operation objects can be spliced in descending order of key values.

After the hash value of the data operation object corresponding to the state transition operation is determined, the state value that is of the target database and that exists after the state transition operation is performed can be determined based on the determined hash value of the data operation object and the state value that is of the target database and that exists before the state transition operation is performed. Specifically, the hash value of the data operation object and the state value that is of the target database and that exists before the state transition operation is performed can be spliced based on a second predetermined sequence, to obtain spliced data. A hash value of the spliced data is determined. The hash value of the spliced data is used as the state value that is of the target database and that exists after the state transition operation is performed.

The first predetermined sequence and the second predetermined sequence here each can be a predetermined splicing sequence. When state values of all databases are calculated, the same splicing sequence should be used when data is spliced. Otherwise, even if data in all the databases is consistent, calculated state values are different, and consistency among the databases cannot be accurately checked.

It is worthwhile to note that, in some cases, two groups of different data possibly become the same spliced data after splicing is performed. For example, data "hello" and "world" can be spliced to obtain spliced data "helloworld", and similarly, data "he" and "lloworld" are spliced to obtain "helloworld". Apparently, the two groups of data are different data before splicing is performed. In this case, to prevent different data from becoming the same data after splicing is performed, when a splicing operation is performed, a separator can be used to ensure uniqueness of spliced data. Specifically, a predetermined separator can be placed at a data splicing location. The predetermined separator can be predefined by a developer. For example, the separator is 123. In this case, data "hello" and "world" can be spliced to obtain "hello123world", and data "he" and "lloworld" can be spliced to obtain "he123lloworld". As such, it can be ensured that two pieces of data are different data after splicing is performed.

Based on the previous method for splicing data by using a separator, when the serialized data corresponding to all the data operation objects is spliced, a predetermined separator can be placed between at least two pieces of serialized data that are to be spliced, and all pieces of serialized data obtained after the predetermined separator is placed are spliced, to obtain the spliced serialized data. Certainly, before data is spliced by using a separator, whether different groups of data are the same data after splicing is performed can be first determined. When a determining result is that spliced data is the same, each group of data is spliced by using the separator, to obtain spliced serialized data.

According to the database state determining method provided in this implementation of the present application, when the state value of the database whose data changes is determined, the state transition operation performed on the target database is determined, and then the state value that is of the database and that exists after the state transition operation is performed can be determined based on the determined state transition operation and the state value that is of the database and that exists before the state transition operation is performed. Compared with the existing technology, there is no need to perform an operation on all data in the entire database, thereby reducing the consumption of excessive computing resources. In addition, compared with that a hash value of a node is calculated by using a tree structure such as a hash tree in the existing blockchain technology, in this implementation of the present application, a tree structure does not need to be constructed, and a hash value of each node in the tree structure does not need to be calculated, thereby reducing the consistency check consumption of excessive computing resources.

In some preferred solutions provided in this implementation of the present application, a serialization operation is performed on a data operation object and a hash operation is performed on serialized data, and this consumes a certain quantity of computing resources. However, in a distributed database, particularly in a blockchain, the database usually stores a very large amount of data, and computing resources consumed by performing a hash operation on the data in the database are much more than computing resources consumed by the previous operation in this implementation of the present application.

According to the previous database state determining method, a state value of a database can be determined. Subsequently, consistency check can be performed on the database based on the determined state value. The following describes in detail a database consistency verifying method provided in the present application.

Figure 3:
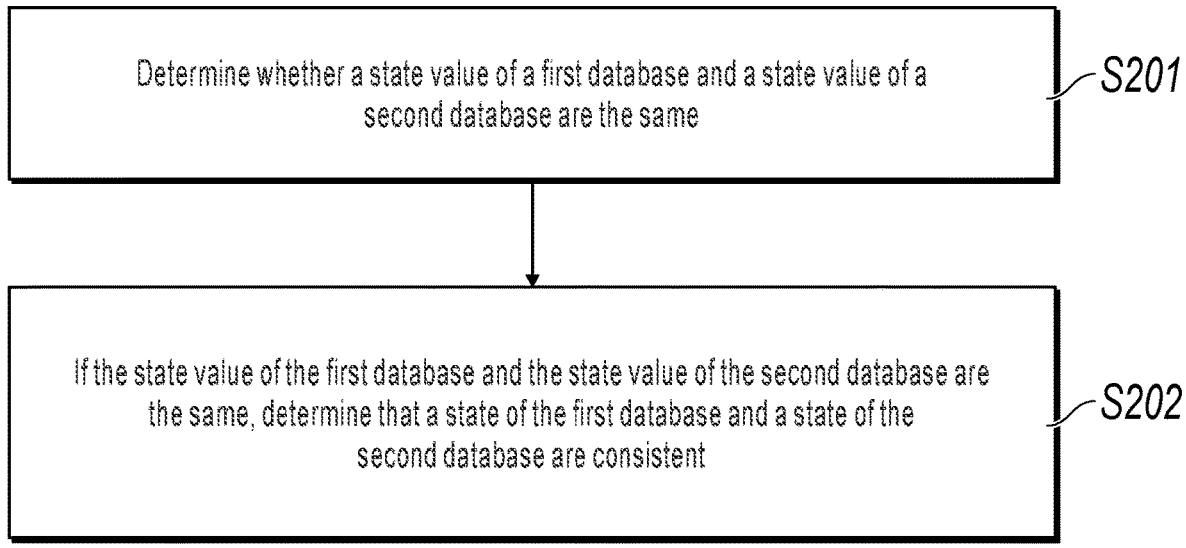
FIG. 3 is a schematic implementation flowchart illustrating a database consistency verifying method, according to the present application.

FIG. 3 is a schematic implementation flowchart illustrating the database consistency verifying method. The method includes the steps below.

Step S201: Determine whether a state value of a first database to be checked and a state value of a second database to be checked are the same.

The first database and the second database here are databases to be checked. In this case, the state value of the first database and the state value of the second database can be separately determined based on the database state determining method provided in this implementation of the present application. For a specific determining process, references can be made to related descriptions in the present application. Details are omitted here for simplicity.

Step S202: If the state value of the first database and the state value of the second database are the same, determine that a state of the first database and a state of the second database are consistent.

If the state value of the first database and the state value of the second database are different, it is determined that the state of the first database and the state of the second database are inconsistent.

Based on the previous inventive concept in the present application, to help better understand the technical features, means, and effects of the present application, the following uses an example that a target database is used as a database of a node in a blockchain technology, to further describe the database state determining method in the present application.

In this implementation of the present application, an example that a blockchain application is a fabric blockchain application, a target database is a LevelDB database, and a database state value is a hash value is used for description. A state transition operation can be performed on the LevelDB database by using a data operation object. The data operation object can write data in a key-value format into the LevelDB database. When the state transition operation is performed in a blockchain, a consensus algorithm is used to ensure that state transition operations are consistent among all nodes and state transition is performed in the same order.

For each blockchain node, when no data is written into a database, an initial state $S^{init}$ of each database is empty. In this case, a hash value can be given. Here, the hash value of the initial state of the database is denoted as $H^{init}$.

Figure 4:
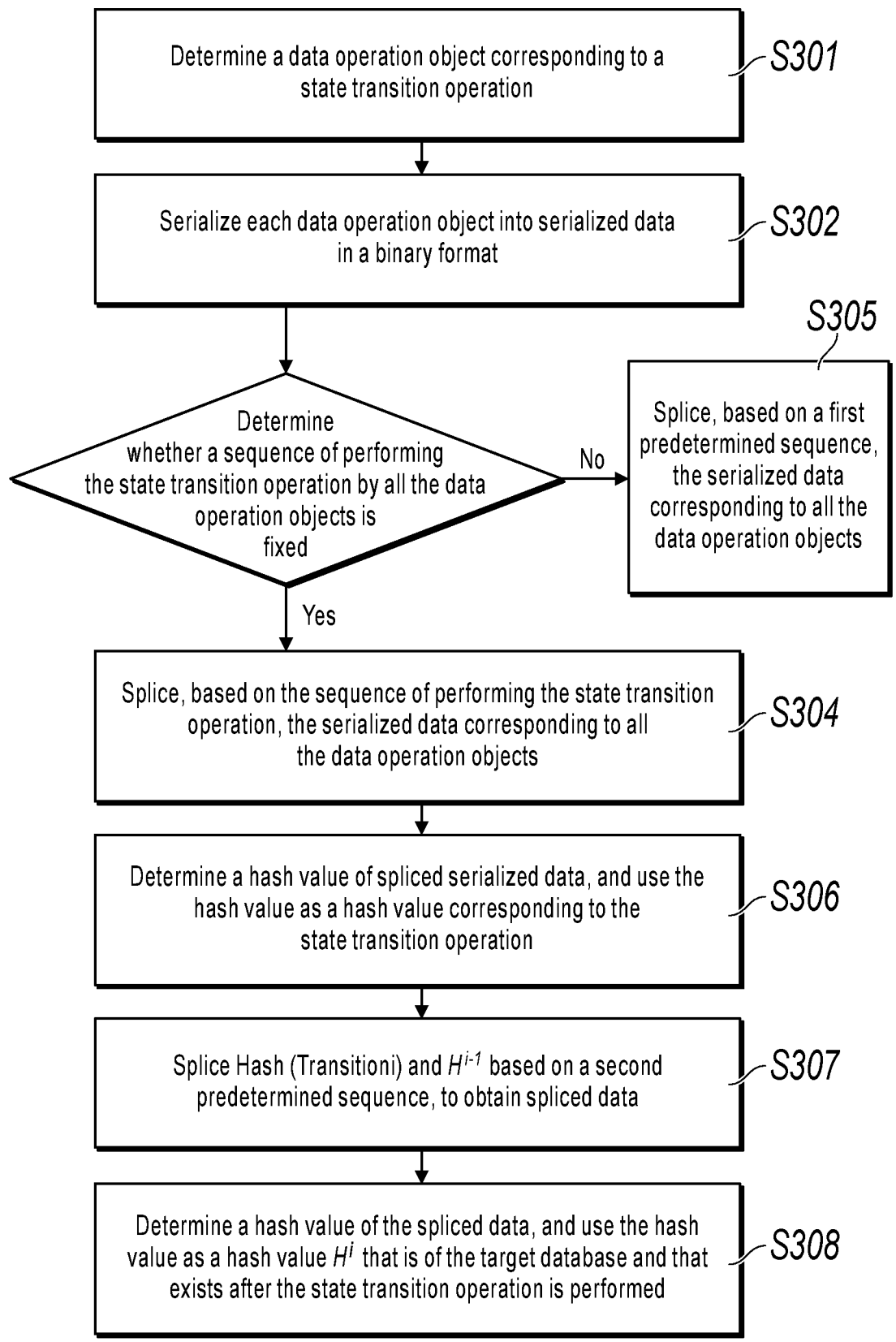
FIG. 4 is a schematic implementation flowchart illustrating a database state determining method, according to the present application.

In this case, when it is determined that an $i^{th}$ state transition operation $Transition^i$ is performed on the target database, a hash value of the target database can be recalculated based on the operation. FIG. 4 is a schematic implementation flowchart of the process, and the process includes the steps below.

Step S301: Determine a data operation object corresponding to the state transition operation.

A single state transition operation usually corresponds to a plurality of data operation objects, and the $i^{th}$ state transition operation $Transition^i$ for the node can be denoted as a set $\{op1, op2 \ldots opN\}$, where op is the abbreviation of "operation", indicates a single data operation object, and means one write operation for a single key-value pair. A format of each op is Key:=NewVal. As such, $\{op1, op2 \ldots opN\}$ indicates write operations for N key-value pairs during the $i^{th}$ state transition operation.

Step S302: Serialize each data operation object into serialized data in a binary format.

Step S303: Determine whether a sequence of performing the state transition operation by all the data operation objects is fixed; and if yes, perform step S304; or if no, perform step S305.

Step S304: If the sequence of performing the state transition operation by all the data operation objects is fixed, splice, based on the sequence of performing the state transition operation, the serialized data corresponding to all the data operation objects, to obtain spliced serialized data; and perform step S306.

Step S305: If the sequence of performing the state transition operation by all the data operation objects is not fixed, splice, based on a first predetermined sequence, the serialized data corresponding to all the data operation objects, to obtain spliced serialized data.

The first predetermined sequence here can be a descending order of key values.

Step S306: Determine a hash value of the spliced serialized data, and use the hash value as a hash value corresponding to the state transition operation.

The spliced serialized data is used as input of the hash algorithm to perform a hash operation, so as to obtain the hash value of the spliced serialized data, that is, a hash value Hash (Transition$^i$) of the state transition operation Transition$^i$.

Step S307: Splice, based on a second predetermined sequence, the hash value corresponding to the state transition operation and a hash value $H^{i-1}$ that is of the target database and that exists before the state transition operation is performed, to obtain spliced data.

Step S308: Determine a hash value of the spliced data, and use the hash value of the spliced data as a hash value $H^i$ that is of the target database and that exists after the state transition operation Transition$^i$ is performed.

The finally obtained hash value $H^i$ that is of the target database and that exists after the state transition operation Transition$^i$ is performed can be represented by the following equation: $H^i := Hash(H^{i-1} \| Hash(Transition^i))$.

$H^0 = H^{init}$, where $\|$ indicates a splicing operation, Hash(x) is a hash function and indicates that a hash operation is performed on input data x, and the hash function can be, for example, SHA3.

According to the database state determining method provided in this implementation of the present application, when the hash value of the database whose data changes, the state transition operation Transition$^i$ performed on the target database is determined; then, the hash value Hash (Transition$^i$) corresponding to the state transition operation is determined; and the state value $H^i$ that is of the database and that exists after the state transition operation is performed can be determined based on the hash value $H^{i-1}$ that is of the database and that exists before the state transition operation is performed. Compared with the existing technology, there is no need to perform an operation on all data in the database of the entire node to obtain a hash value, thereby reducing the consumption of excessive computing resources. In addition, compared with that a hash value of a node is calculated by using a tree structure such as a hash tree in the existing blockchain technology, in this implementation of the present application, a tree structure does not need to be constructed, and a hash value of each node in the tree structure does not need to be calculated, so that consumption of computing resources is further reduced.

Figure 5:
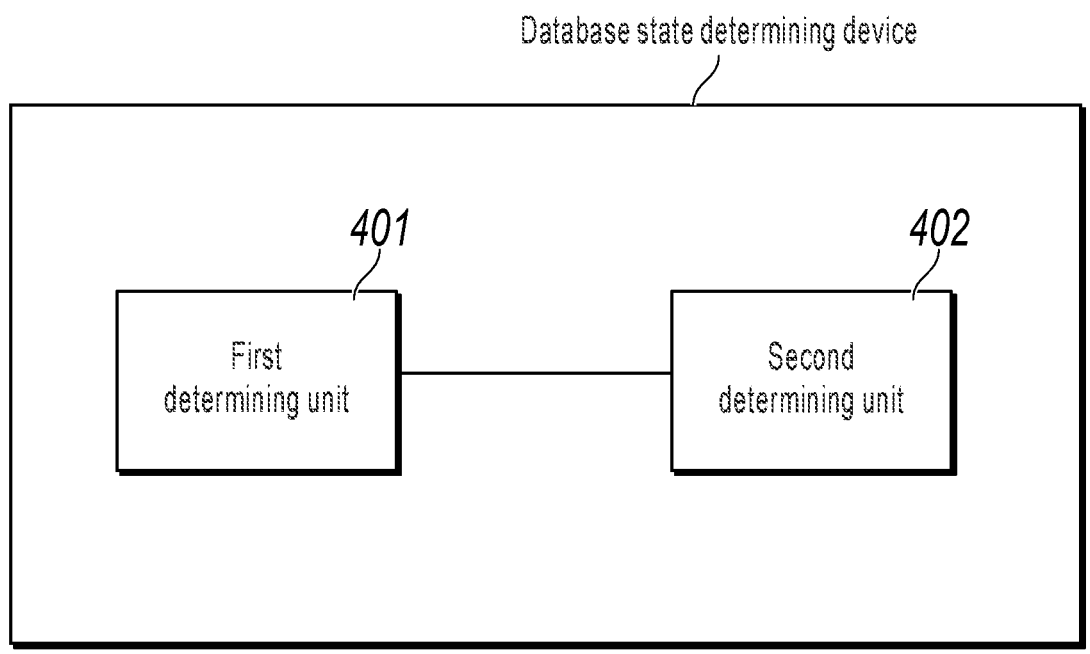
FIG. 5 is a schematic diagram illustrating a specific structure of a database state determining device, according to the present application.

The database state determining method provided in the implementations of the present application is described above. As shown in FIG. 5, based on the same idea, an implementation of the present application further provides a corresponding database state determining device. The device specifically includes: a first determining unit 401, configured to determine a state transition operation performed on a target database; and a second determining unit 402, configured to determine, based on the determined state transition operation and a state value that is of the target database and that exists before the state transition operation is performed, a state value that is of the target database and that exists after the state transition operation is performed, where the state value is used to represent a state of the target database.

In this implementation of the present application, there are still many specific implementations of determining a database state. In an implementation, the first determining unit 401 is configured to determine a data operation object used to perform the state transition operation on the target database.

The second determining unit 402 is configured to determine, based on the determined data operation object and the state value that is of the target database and that exists before the state transition operation is performed, the state value that is of the target database and that exists after the state transition operation is performed.

In an implementation, the second determining unit 402 specifically includes a first hash value determining subunit 403 and a first state value determining subunit 404.

The first hash value determining subunit 403 is configured to determine a hash value of the data operation object.

The first state value determining subunit 404 is configured to determine, based on the determined hash value of the data operation object and the state value that is of the target database and that exists before the state transition operation is performed, the state value that is of the target database and that exists after the state transition operation is performed.

In an implementation, the first hash value determining subunit 403 specifically includes a serialized data determining subunit 405 and a second hash value determining subunit 406.

The serialized data determining subunit 405 is configured to serialize the data operation object to obtain serialized data.

The second hash value determining subunit 406 is configured to: determine a hash value of the serialized data, and use the hash value of the serialized data as the hash value of the data operation object.

In an implementation, the serialized data determining subunit 405 specifically includes a first splicing subunit 407 and a second splicing subunit 408.

In an implementation, the first splicing subunit 407 is configured to: when there is more than one data operation object used to perform the state transition operation on the target database, and a sequence of performing the state transition operation by all data operation objects is fixed, splice, based on the sequence of performing the state transition operation, serialized data corresponding to all the data operation objects, to obtain spliced serialized data.

The second splicing subunit 408 is configured to: when there is more than one data operation object used to perform the state transition operation on the target database, and a sequence of performing the state transition operation by all data operation objects is not fixed, splice, based on a first predetermined sequence, serialized data corresponding to all the data operation objects, to obtain spliced serialized data.

To prevent different groups of data from being the same data after splicing is performed, in an implementation, the second splicing subunit 408 is configured to: place a predetermined separator between at least two pieces of serialized data, and splice all pieces of serialized data obtained after the predetermined separator is placed, to obtain the spliced serialized data.

In an implementation, the first state value determining subunit 404 is configured to: splice, based on a second predetermined sequence, the hash value of the data operation object and the state value that is of the target database and that exists before the state transition operation is performed, to obtain spliced data; and determine a hash value of the spliced data, and use the hash value of the spliced data as the state value that is of the target database and that exists after the state transition operation is performed.

In an implementation, the target database is a database corresponding to any node in a blockchain.

In an implementation, the state value is used to uniquely represent a characteristic of data stored in the target database.

According to the database state determining device provided in this implementation of the present application, when the state value of the database whose data changes is determined, the state transition operation performed on the target database is determined, where the state transition operation is a state transition operation that causes the data change. Then, the state value that is of the database and that exists after the state transition operation is performed is determined based on the determined state transition operation and the state value that is of the database and that exists before the state transition operation is performed. Compared with the existing technology, there is no need to perform an operation on all data in the entire database, thereby reducing the consumption of excessive computing resources.

Figure 6:
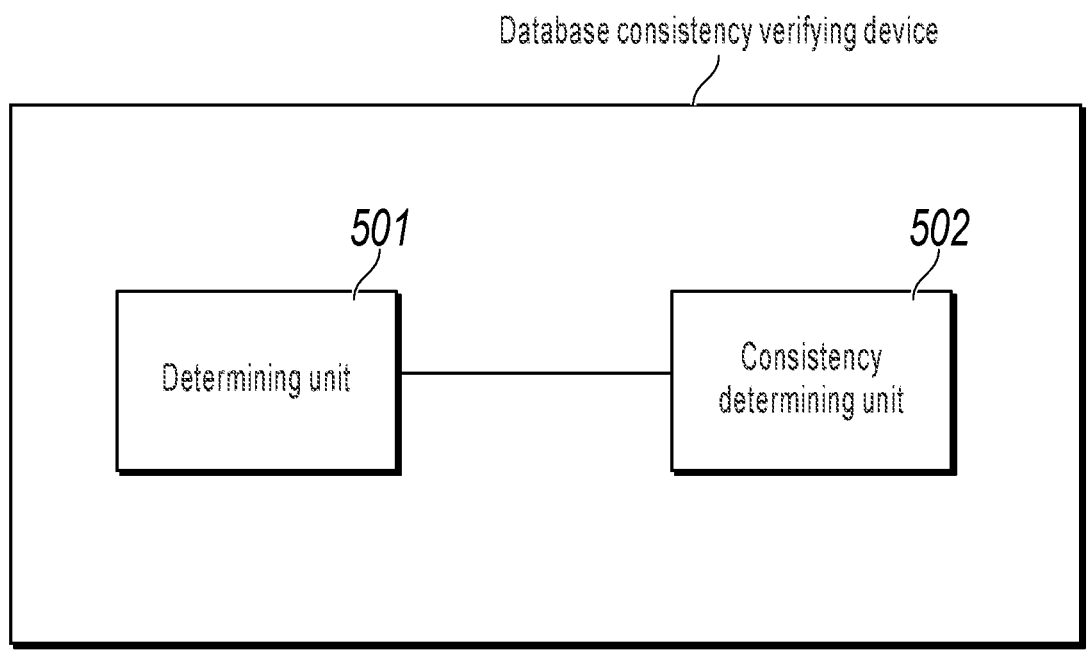
FIG. 6 is a schematic diagram illustrating a specific structure of a database consistency verifying device, according to the present application.

An implementation of the present application further provides a corresponding database consistency verifying device. As shown in FIG. 6, the device specifically includes: a determining unit 501, configured to determine whether a state value of a first database to be checked and a state value of a second database to be checked are the same, where the state value of the first database and the state value of the second database are determined by using the device provided in the previous implementation of the present application; and a consistency determining unit 502, configured to: when it is determined that the state value of the first database and the state value of the second database are the same, determine that a state of the first database and a state of the second database are consistent.

It is worthwhile to note that, in the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that implementation of the present disclosure can be provided as a method, a system, or a computer program product. Therefore, the present application can use a form of hardware only implementations, software-only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of another programmable data processing device generate a device for implementing a specific function in one or more processes in the flowcharts and/or in one or more blocks in the block diagrams.

These computer program instructions can be stored in a computer-readable memory that can instruct the computer or another programmable data processing device to work in a specific way, so that the instructions stored in the computer-readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a calculating device includes one or more processors (CPU), an input/output interface, a network interface, and a memory.

The memory can include a non-persistent memory, a random access memory (RAM), a non-volatile memory, and/or another form in a computer-readable medium, for example, a read-only memory (ROM) or a flash memory (flash RAM). The memory is an example of the computer-readable medium. The memory is an example of the computer-readable medium.

The computer-readable medium includes persistent, non-persistent, movable, and unmovable media that store information storage by using any method or technology. The information can be a computer-readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer-readable medium does not include transitory media (transitory media), for example, a modulated data signal and carrier.

It is worthwhile to further note that the terms "include", "comprise", or their any other variant is intended to cover a non-exclusive inclusion, so a process, a method, a product, or a device that includes a list of elements not only include those elements but also includes other elements which are not expressly listed, or further includes elements inherent to such a process, a method, a product, or a device. An element preceded by "includes a . . . " does not, without more constraints, preclude the existence of additional identical elements in the process, method, product, or device that includes the element.

The present application can be described in the general context of computer-executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are only implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for database state determination, comprising:
   determining, by at least one processor, a state transition operation performed on a first target database and determining one or more data operation objects used to perform the state transition operation on the first target database;
   serializing each of the one or more data operation objects into corresponding serialized data in binary format;
   obtaining spliced serialized data by splicing the serialized data corresponding to the one or more data operation objects;

obtaining spliced data based on the spliced serialized data and a first state value of the first target database before the state transition operation;

determining, based on the spliced data, a first state value of the first target database after the state transition operation, wherein the first state value is used to represent a first state of the first target database and is used to uniquely represent a characteristic of data stored in the first target database; and in response to determining that the first state value of the first target database matches a second state value of a second target database, determining that the first target database is consistent with the second target database.

2. The computer-implemented method of claim 1, wherein:

the first target database is a blockchain database; and the determining the first state value of the first target database after the state transition operation comprises:

determining a hash value of the one or more data operation objects; and determining, based on the hash value of the one or more data operation objects and the first state value of the first target database before the state transition operation, the first state value of the first target database after the state transition operation.

3. The computer-implemented method of claim 2, wherein the determining the hash value of the one or more data operation objects comprises:

serializing the one or more data operation objects to obtain serialized data;

determining a hash value of the serialized data; and using the hash value of the serialized data as the hash value of the one or more data operation objects.

4. The computer-implemented method of claim 3, wherein serializing the one or more data operation objects to obtain the serialized data comprises:

in response to determining that there is more than one data operation object used to perform the state transition operation on the first target database:

in response to determining that a sequence of performing the state transition operation by all data operation objects is fixed, splicing, based on the sequence of performing the state transition operation, serialized data corresponding to all data operation objects, to obtain spliced serialized data; or in response to determining that a sequence of performing the state transition operation by all data operation objects is not fixed, splicing, based on a first predetermined sequence, serialized data corresponding to all data operation objects, to obtain spliced serialized data.

5. The computer-implemented method of claim 4, wherein splicing the serialized data corresponding to all data operation objects comprises:

placing a predetermined separator between at least two pieces of serialized data; and obtaining the spliced serialized data by splicing all pieces of serialized data obtained after the predetermined separator is placed.

6. The computer-implemented method of claim 2, wherein the determining the first state value of the first target database after the state transition operation comprises:

obtaining spliced data by splicing, based on a second predetermined sequence, the hash value of the one or more data operation objects and the first state value of the first target database before the state transition operation;

determining a hash value of the spliced data; and using the hash value of the spliced data as the first state value of the first target database after the state transition operation.

7. The computer-implemented method of claim 1, wherein the first target database is a database corresponding to any node in a blockchain.

8. A non-transitory, computer-readable medium storing one or more instructions executable by a computer system to perform operations comprising:

determining a state transition operation performed on a first target database and determining one or more data operation objects used to perform the state transition operation on the first target database;

serializing each of the one or more data operation objects into corresponding serialized data in binary format;

obtaining spliced serialized data by splicing the serialized data corresponding to the one or more data operation objects;

obtaining spliced data based on the spliced serialized data and a first state value of the first target database before the state transition operation;

determining, based on the spliced data, a first state value of the first target database after the state transition operation, wherein the first state value is used to represent a first state of the first target database and is used to uniquely represent a characteristic of data stored in the first target database; and in response to determining that the first state value of the first target database matches a second state value of a second target database, determining that the first target database is consistent with the second target database.

9. The non-transitory, computer-readable medium of claim 8, wherein:

the first target database is a blockchain database; and the determining the first state value of the first target database after the state transition operation comprises:

determining a hash value of the one or more data operation objects; and determining, based on the hash value of the one or more data operation objects and the first state value of the first target database before the state transition operation, the first state value of the first target database after the state transition operation.

10. The non-transitory, computer-readable medium of claim 9, wherein the determining the hash value of the one or more data operation objects comprises:

serializing the one or more data operation objects to obtain serialized data;

determining a hash value of the serialized data; and using the hash value of the serialized data as the hash value of the one or more data operation objects.

11. The non-transitory, computer-readable medium of claim 10, wherein serializing the one or more data operation objects to obtain the serialized data comprises:

in response to determining that there is more than one data operation object used to perform the state transition operation on the first target database:

in response to determining that a sequence of performing the state transition operation by all data operation objects is fixed, splicing, based on the sequence of performing the state transition operation, serialized data corresponding to all data operation objects, to obtain spliced serialized data; or in response to determining that a sequence of performing the state transition operation by all data operation objects is not fixed, splicing, based on a first predetermined sequence, serialized data corresponding to all data operation objects, to obtain spliced serialized data.

12. The non-transitory, computer-readable medium of claim 11, wherein splicing the serialized data corresponding to all data operation objects comprises:
   placing a predetermined separator between at least two pieces of serialized data; and
   obtaining the spliced serialized data by splicing all pieces of serialized data obtained after the predetermined separator is placed.

13. The non-transitory, computer-readable medium of claim 9, wherein the determining the first state value of the first target database after the state transition operation comprises:
   obtaining spliced data by splicing, based on a second predetermined sequence, the hash value of the one or more data operation objects and the first state value of the first target database before the state transition operation;
   determining a hash value of the spliced data; and
   using the hash value of the spliced data as the first state value of the first target database after the state transition operation.

14. The non-transitory, computer-readable medium of claim 8, wherein the first target database is a database corresponding to any node in a blockchain.

15. A computer-implemented system, comprising:
   one or more computers; and
   one or more computer memory devices interoperably coupled with the one or more computers and having tangible, non-transitory, machine-readable media storing one or more instructions, wherein when the one or more instructions are executed by the one or more computers, the one or more computers perform one or more operations comprising:
   determining a state transition operation performed on a first target database and determining one or more data operation objects used to perform the state transition operation on the first target database;
   serializing each of the one or more data operation objects into corresponding serialized data in binary format;
   obtaining spliced serialized data by splicing the serialized data corresponding to the one or more data operation objects;
   obtaining spliced data based on the spliced serialized data and a first state value of the first target database before the state transition operation;
   determining, based on the spliced data, a first state value of the first target database after the state transition operation, wherein the first state value is used to represent a first state of the first target database and is used to uniquely represent a characteristic of data stored in the first target database; and
   in response to determining that the first state value of the first target database matches a second state value of a second target database, determining that the first target database is consistent with the second target database.

* * * * *